3,409,650
TRANSITION METAL COMPOUNDS
CONTAINING $B_{10}H_{10}CH^{3-}$
Walter H. Knoth, Jr., Mendenhall, Pa., assignor to E. I. du Pont de Nemours and Company, Wilmington, Del., a corporation of Delaware
No Drawing. Filed Aug. 19, 1966, Ser. No. 573,484
13 Claims. (Cl. 260—429)

This invention relates to novel compounds containing the entity $B_{10}H_{10}CH^{3-}$ and to processes for preparing them. More specifically, the invention concerns compounds containing two icosahedral fragments having the formula $B_{10}H_{10}CH^{3-}$ in conjunction with selected transition metal cations.

The $B_{10}H_{10}CH^{3-}$ anion is believed to consist of an eleven-particle icosahedral fragment composed of ten boron atoms and one carbon atom. This structure results in a void or vacant position at the twelfth position of the icosahedron, and it is believed that the transition metal is bonded to the five atoms positioned around the vacant position. These five atoms around the vacant position form an open pentagonal face which resembles the cyclopentadienide anion in its geometry and bonding properties. Thus the compounds of this invention can be regarded as "sandwich compounds" in which the transition metal is bonded to two sets of the 5 atoms forming the open pentagonal face, i.e., the transition metal is associated with two $B_{10}H_{10}CH^{3-}$ anions.

Alternatively, the structure of the novel compounds of this invention can be regarded as a spirocage structure, with each of the two cages being an icosahedron and the transition metal atom being the spiro atom.

In addition, the hydrogen atoms bonded to boron can be replaced by halogen.

The novel compounds of the invention can be represented by the formula

$$M_m[(B_{10}H_{10-n}X_nCH)_2M']$$

wherein the components are discussed in detail below.

The entity $(B_{10}H_{10-n}X_nCH)$ is the icosahedral fragment consisting of ten boron (B) atoms and one carbon (C) atom, X represents halogen (i.e., fluorine, chlorine, bromine, iodine, or mixtures thereof) that is substituted on boron by replacement of hydrogen, and $n$ is a whole number of 0 through 8 and represents the number of X substituents on boron.

M' represents the transition metal and is selected from Ti(IV), Fe(II), Fe(III), Cr(III), Mn(IV), Co(II), Co(III), Co(IV), and Ni(IV).

The entity $[(B_{10}H_{10-n}X_nCH)_2M']$ is an anion whose valence is determined by adding the valence of the $(B_{10}H_{10-n}X_nCH)$, which is $-3$, and the valence of the transition metal. Thus a cation, M, is necessary solely to fulfill valence requirement. The letter $m$ represents the valence of the entity and is a whole number of 2 through 4. The cation M can be hydrogen, an alkali metal, one equivalent of an alkaline-earth metal, silver, ammonium, $RNH_3^+$, $RR'NH_2^+$, $RR'_2NH^+$, $RR'_3N^+$, $R_4P^+$, $R_3S^+$, $R_4As^+$ or $R_4Sb^+$ wherein R' is aliphatically saturated hydrocarbyl bonded to N through aliphatic carbon, each of up to 18 carbon atoms and preferably up to 12 carbon atoms, and R is aliphatically saturated hydrocarbyl of up to 18 carbon atoms and preferably up to 12 carbons. Any two R and R' groups in the same cation can also be joined (bonded) to each other directly or through an ethereal oxygen atom to form a divalent, aliphatically saturated hydrocarbyl or oxygen-interrupted (mono-oxa) hydrocarbyl group, of up to 18 carbon atoms and preferably up to 12 carbon atoms. More preferably this divalent group is alkylene of 4–8 carbon atoms. "Aliphatically saturated hydrocarbyl" is defined as a hydrocarbyl group that does not contain any aliphatic unsaturation, i.e., the hydrocarbyl groups can be alkyl, cycloalkyl, aryl, alkaryl, or aralkyl.

Examples of the above M cations include sodium, potassium, rubidium, barium, calcium, strontium, magnesium, cesium, methylammonium, cyclopropylammonium, 1-methylheptylammonium, 2-(1-naphthyl)ethylammonium, octadecylammonium, p-ethylanilinium, diisobutylammonium, dicyclohexylammonium, dinonylammonium, morpholinium, dodecamethyleniminium, triisopropylammonium, N-methylpiperidinium, trihexylammonium, dodecyldimethylammonium, tetraisopentylammonium, heptyltrimethylammonium, trimethylpentylammonium, cyclodecyltrimethylammonium, N,N-didodecylmorpholinium, dimethylanilinium, tetramethylphosphonium, tetranaphthylphosphonium, ethylpentamethylene-p-tolylphosphonium, dimethyloctadecylsulfonium, methyltetramethylenesulfonium, triethylsulfonium, tetraphenylarsonium, benzylhexadecyldimethylarsonium, dodecyltriethylarsonium, tetramethylstibonium, dibenzyldimethylstibonium, and the like.

Of the above R and R'-substituted cations, those containing only lower alkyl (1–6 carbon atoms) are preferred, especialy tetramethylammonium and trimethylammonium. Preferred cations overall are hydrogen, the alkali metals, especially cesium, and the ones in the preceding sentence.

Compounds of the invention in which M is hydrogen are ordinarily isolated as solvates. Since these compounds are most commonly worked with in aqueous media, the most common types of solvates are hydrates. The exact position of attachment of the solvate molecules is not known, but at least some of them are almost certainly associated with the hydrogen ions. It is to be understood, therefore, that the term "hydrogen," as used here, includes, and in fact essentially always refers to, hydrogen ions solvated with water or other solvent molecules. When M is hydrogen, the degree of solvation of the hydrogen ion is of no particular importance to the present invention. The above usage of the term "hydrogen" is based on nomenclature approved by the International Union of Pure and Applied Chemistry; see J. Am. Soc., 82, 5529–30 (1960).

Of the M' transition metals described above, Cr(III), Mn(IV), Fe(III), Co(III), Co(IV), and Ni(IV) are most preferred.

The novel compounds of this invention are prepared by reacting a boron compound of the formula

$$M''B_{10}H_{12}CH$$

wherein M'' is the same as M with the exclusion of hydrogen (and will be referred to hereafter as M'') with a base selected from an alkyl-, aryl-, or alkaryllithium of up to 12 carbon atoms, an alkali metal, or an alkali-metal hydride, in the presence of an inert solvent, followed by the addition of a compound selected from $TiZ_4$, $M'''Z_3$ or $M^{IV}Z_2$ wherein M''' is Fe(III) or Cr(III), and $M^{IV}$ is Mn(II), Fe(II), Co(II) or Ni(II), and Z is chlorine, bromine or iodine, said steps being carried out at a temperature of between $-50°$ C. and $+100°$ C., and preferably between $0°$ and $60°$ C. Preferably M'' is alkali metal, tetra(lower alkyl)ammonium, or tri(lower alkyl)ammonium.

The inert solvent is preferably an aromatic or aliphatic hydrocarbon ether such as tetrahydrofuran, dioxane, ethyl ether, anisole, phenyl ether, 1,2-dimethoxyethane, and the like.

Pressure is not critical and super- or subatmospheric pressures may be employed, but for convenience, atmospheric pressures are preferred. The time of reaction is not critical and will depend upon the reactants used, the temperature employed and the yield of product desired. Nor is the ratio of reactants critical; however, it is preferred to employ at least two equivalents of the base for each equivalent of boron compound in order to abstract two hydrogen ions and transform $B_{10}H_{12}CH^-$ to $B_{10}H_{10}CH^{3-}$. In addition, when the cation in the reactant contains one or more hydrogens bonded to nitrogen, an equivalent of base is preferably added for each such nitrogen.

The reaction is preferably carried out in an inert atmosphere such as nitrogen, argon, helium, and the like.

The initial products of the reaction will be a salt or a mixture of salts containing the $(B_{10}H_{10}CH)_2M^v$ anion, wherein $M^v$ is Ti(IV), Mn(IV), Fe(II), Fe(III), Cr(III), Co(III) or Ni(IV). When the transition metal reactant is $M^{IV}X_2$, the $M^{IV}$ metal is essentially completely oxidized to a higher valence state with the exception of iron. Thus, when $FeCl_2$ is employed, the reaction mixture will contain both $(B_{10}H_{10}CH)_2Fe(II)^{4-}$ and $$(B_{10}H_{10}CH)_2Fe(III)^{3-}$$

If desired, air can be bubbled through the reaction mixture prior to isolation of the product to ensure complete oxidation of Fe(II) to Fe(III). The addition of $FeCl_3$ may catalyze such oxidation at this stage. To obtain compounds wherein M' is Co(IV), the corresponding compound wherein M' is Co(III) is oxidized with ceric ammonium sulfate.

Isolation of the products is carried out by conventional procedures based upon selective precipitation with a precipitating cation. Preferably the precipitating cation will be $RR'_2NH^+$, $RR'_3N^+$ or $Cs^+$ and will be added in its chloride or hydroxide form.

Alternatively, products of the invention wherein M' is Co(III) or Ni(IV) can be prepared by reacting $M''B_{10}H_{12}CH$ with a 1–50% aqueous or alcoholic solution of an alkali-metal hydroxide, preferably sodium hydroxide, followed by the addition of $CoZ_2$ or $NiZ_2$. The reaction conditions are as described for the preceding process except that here an inert atmosphere is not needed. This modification is the preferred procedure for obtaining the Co(III) or Ni(IV) products since the need for inert atmosphere is eliminated.

As mentioned above, the initial products obtained are, with exception or iron, ones in which the transition metal is in its higher valence state. To obtain the lower-valence-state compounds, the initial products are treated with a strong reducing agent, such as sodium borohydride, lithium aluminum hydride, or zinc and hydrochloric acid.

To obtain products of the invention which contain X groups, the initial products are simply halogenated with a halogenating agent at a temperature of between about 0° C. to about 100° C., and preferably 0° C. to 40° C., in an inert solvent, such as water, alcohol or acetonitrile. Representative halogenating agents include N-halosuccinimides such as N-chloro, N-bromo, and N-iodosuccinimide; halogens such as fluorine, chlorine, bromine, iodine; and mixed halogens, such as iodine monochloride in tetrachloroethane. Water is the preferred solvent for fluorination with fluorine. The halogenation reaction may oxidize some M' metals to their higher valence state, but the M' metal can be reduced to its lower state by the procedure described in the preceding paragraph.

Once the initial products are obtained, the cation M can be replaced with any other M cation by ordinary cation-exchange techniques. For example, the salts of the invention obtained by the initial procedure described above will usually be the $Cs^+$, $RR'_2NH^+$, $RR'_3N^+$, $R_4P^+$, $R_3S^+$, $R_4As^+$ or $R_4Sb^+$ salts because they are relatively insoluble in water and are thus most easily obtained. These salts can then be subjected to conventional cation-exchange techniques to obtain other salts or acids of the invention. For example, cation-exchange resins can be prepared containing the desired cation (e.g., hydrogen, sodium, ammonium, and the like), and a solution of the salt whose cation is to be replaced passed through. Alternatively, once the acids of this invention (i.e., where M is hydrogen) are obtained, they can be treated with an equivalent amount of a hydroxide containing the desired replacing cation. The water can then be evaporated leaving the desired salt. When the desired cation is $NH_4^+$, $RNH_3^+$, $RR'NH_2^+$, or $RR'_2NH^+$, then anhydrous ammonia or the appropriate anhydrous amine can be used for neutralization instead of the hydroxide. In addition, when the base is volatile, an excess can be used and any remaining can be removed by evaporation.

The M cation exchange reactions can be employed with any M'-containing compound of the invention, as well as with any X-containing compound of the invention.

The products obtained in this invention are sometimes hydrates, which can be, with the exception of when M is hydrogen, dehydrated by known procedures.

The $M''B_{10}H_{12}CH$ used as the reactant in the initial process is prepared as described in applicant's copending application Ser. No. 547,153, filed May 3, 1966, in the name of Walter M. Knoth, Jr., by reacting the compound $B_{10}H_{12}CNR^v_3$ wherein each $R^v$ group is of up to 18 carbon atoms and is selected from alkyl, cycloalkyl, or aralkyl, bonded to the nitrogen through carbon bearing at least one hydrogen, with sodium, lithium, or potassium in a saturated bis aliphatic ether or diether of up to 8 carbon atoms. Representative ethers include tetrahydrofuran, diethyl ether, dibutyl ether, dioctyl ether, 1,4-dioxane, diethylene glycol diethyl ether, 1,2-dimethoxyethane, and the like. Preferably, $R^v$ in the reactant is lower alkyl. This reaction is carried out at temperatures between 35–150° C., and preferably between 55–100° C. Pressure and reaction time are not critical and will depend upon the temperature and the solvent used. The product is isolated by conventional methods such as precipitation and recrystallization. The $B_{10}H_{12}CNR^v_3$ reactant is prepared as described in copending application Ser. No. 463,336, filed June 11, 1965, in the name of Walter H. Knoth, Jr., by treating $CsB_{10}H_{13}CN$ with dilute HCl or an acid ion-exchange resin, followed by dioxane, and then reacting the resulting precipitate with sodium hydroxide and a hydrocarbylating agent such as a dialkyl sulfate. The $CsB_{10}H_{13}CN$ compound is prepared as described in J. Inorg. Nucl. Chem., 20, 66 (1961).

Examples of the organo-lithium reagent include methyllithium, isopropyllithium, tert-butyllithium, heptyllithium, dodecyllithium, phenyllithium, 1- and 2-naphthyllithium, 4-biphenyllithium, o-, m-, and p-tolyllithium, and 2,4,6-trimethylphenyllithium. Examples of the alkali metals and alkali metal hydrides include sodium, lithium, potassium, rubidium, and their hydrides.

The products and processes of the invention are illustrated in further detail in the following examples, which are illustrative only and are not intended to be limiting:

Example 1

Twenty-five ml. of a 1.6 molar solution of butyllithium in hexane was added, in a nitrogen atmosphere, to a solution of $CsB_{10}H_{12}CH$ (2.0 g.) in 50 ml. of 1,2-dimethoxyethane. The temperature rose to 60° C. The solution was cooled to 30° C. and $FeCl_2$ (1.9 g.) was added. The mixture was stirred 1½ hours and then filtered. The filter cake was extracted with two 35 ml. portions of water. These extracts were combined and mixed with 30 ml. of 50% aqueous cesium hydroxide solution. A precipitate separated slowly; this was removed by filtration and recrystallized from water to obtain 0.4 g. of $$Cs_3(B_{10}H_{10}CH)_2Fe$$

as a monohydrate. The product was a dark solid, a dilute solution of which was red.

*Analysis.*—Calcd. for $Cs_3(B_{10}H_{10}CH)_2Fe \cdot H_2O$: B, 29.4; Fe, 7.6. Found: B, 29.3; Fe, 7.3.

$\lambda^{H_2O}_{max.}$ 575 ($\epsilon$, 266), 372 ($\epsilon$, 1100), 274 ($\epsilon$, 21,200)

Example 2

Twenty-five ml. of a 1.6 molar solution of butyllithium in hexane was added to a solution of $CsB_{10}H_{12}CH$ (1.8 g.) in 50 ml. of 1,2-dimethoxyethane in a nitrogen atmosphere. The temperature rose to 60° C. The solution was cooled to 15° C. and $FeCl_3$ (1.86 g.) was added. The mixture was stirred 30 minutes and then filtered. The filter cake was extracted with water; the extracts were mixed with 50% aqueous cesium hydroxide with the resulting separation of an oil which slowly solidified. Recrystallization of this solid from water gave 0.1 g. of $$Cs_3(B_{10}H_{10}CH)_2Fe \cdot H_2O$$

identified by infrared analysis.

Example 3

(A) Twenty-two ml. of a 1.6 molar solution of butyllithium in hexane was added to a solution of $$(CH_3)_3NHB_{10}H_{12}CH$$

(2.0 g.) in 75 ml. of anhydrous tetrahydrofuran in a nitrogen atmosphere. The mixture was stirred one hour and $CoCl_2$ (0.7 g.) was then added. The mixture was refluxed for two hours and then filtered. The filter cake was extracted with several portions of water to obtain 90 ml. of a dark-colored extract. This was mixed with 20 ml. of 50% aqueous cesium hydroxide to precipitate $$Cs_3(B_{10}H_{10}CH)_2Co \cdot H_2O$$

as a dark brownish yellow solid (2.2 g.). The analytical sample was recrystallized from water and dried for 18 hours at 80° in vacuo.

*Analysis.*—Calcd. for $Cs_3(B_{10}H_{10}CH)_2Co \cdot H_2O$: B, 29.3; Co, 8.0. Found: B, 30.0; Co, 9.6.

U.V. $\lambda_{max.}^{H_2O}$ 510 ($\epsilon$, 224), 413 ($\epsilon$, 610), 275 ($\epsilon$, 37,700)

(B) Treatment of an aqueous solution of the product, initially brown, with sodium borohydride at the boil gave a red solution, indicating reduction of $(B_{10}H_{10}CH)_2Co^{3-}$ to $(B_{10}H_{10}CH)_2Co^{4-}$. This anion was readily reoxidized on contact with air as shown by the fact that the solution turned brown again.

Example 4

Thirty-three ml. of a 1.6 molar solution of butyllithium in hexane was added to a solution of $$(CH_3)_3NHB_{10}H_{12}CH$$

(3.0 g.) in 100 ml. of tetrahydrofuran in a nitrogen atmosphere. The mixture was stirred 20 minutes and then $CoCl_2$ (2.2 g.) was added. This mixture was stirred for one hour and then refluxed for two hours. Filtration followed by aqueous extraction of the filter cake and treatment of the extract with tetramethylammonium chloride precipitated $[(CH_3)_4N]_3(B_{10}H_{10}CH)_2Co$ (2.4 g.). This was removed by filtration and additional amounts of the same product slowly crystallized from the filtrate. The latter was removed (0.8 g.) and recrystallized twice from aqueous alcohol to give golden-yellow crystals of $$[(CH_3)_4N]_3(B_{10}H_{10}CH)_2Co$$

*Analysis.*—Calcd. for $[(CH_3)_4N]_3(B_{10}H_{10}CH)_2Co$: B, 39.6; C, 31.0; H, 10.7; N, 7.7. Found: B, 40.6; C, 30.9; H, 11.0; N, 8.0.

U.V. $\lambda_{max.}^{H_2O}$ 418 ($\epsilon$, 370), 275 ($\epsilon$, 40,400)

Example 5

In a nitrogen atmosphere, 50 ml. of a 1.6 molar solution of butyllithium in hexane was added to a solution of $(CH_3)_3NHB_{10}H_{12}CH$ (3.0 g.) in 100 ml. of tetrahydrofuran. The mixture was stirred 20 minutes and then cooled to 8° C. in a water-ice bath. Nickel(II) chloride (3.0 g.) was added. The temperature rose to a 22° C. and a dark color developed after 10–15 seconds. The ice bath was removed after two minutes. The mixture was stirred two hours and then allowed to stand for 18 hours. Filtration gave a dark filter cake which was extracted with water. The extract was filtered. Part of the filtrate was mixed with tetramethylammonium chloride to precipitate $$[(CH_3)_4N]_2(B_{10}H_{10}CH)_2Ni$$

which was recrystallized from water. Both salts were characterized by infrared analysis. The remainder of the filtrate was treated with excess trimethylammonium chloride to precipitate $[CH_3)_3NH]_2(B_{10}H_{10}CH)_2Ni$ which was recrystallized from water. Both salts were orange solids.

*Analysis.*—Calcd. for $[(CH_3)_3NH]_2(B_{10}H_{10}CH)_2Ni$: B, 49.1; C, 21.8; H, 9.6; N, 6.4. Found: B, 46.9; C, 22.0; H, 8.8; N, 6.5.

U.V. $\lambda_{max.}^{CH_3CN}$ 290 ($\epsilon$, 35,300)

Example 6

In a nitrogen atmosphere, 50 ml. of a 1.6 molar solution of butyllithium in hexane was added to a solution of $(CH_3)_3NHB_{10}H_{12}CH$ (3.0 g.) in 100 ml. of tetrahydrofuran. The resulting mixture was cooled to 10° C. in a water-ice bath. Three grams of chromium(III) chloride was added, resulting in a temperature rise to 28° C. The cooling bath was removed and the solution was allowed to stand for 18 hours. Filtration gave a dark blue filter cake. This was rinsed with tetrahydrofuran, resulting in dissolution of the filter cake. Therefore, the "rinse," containing all the filter cake in solution, was recombined with the original filtrate and this combined solution was evaporated to dryness. The residue was extracted with 50 ml. of water and the extracts were filtered through diatomaceous earth ("Celite") to obtain a dark blue filtrate. Three 5-ml. portions of 50% aqueous cesium hydroxide were added. Filtration gave a dark blue filter cake plus a red filtrate. Slow concentration of the filtrate precipitated $Cs_3(B_{10}H_{10}CH)_2Cr \cdot H_2O$ as a crystalline red solid (1.2 g.) which was recrystallized from water.

*Analysis.*—Calcd. for $Cs_3(B_{10}H_{10}CH)_2Cr \cdot H_2O$: B, 29.6; C, 3.3; H, 3.3. Found: B, 30.2; C, 3.5; H, 3.1.

U.V. $\lambda_{max.}^{H_2O}$ 490 ($\epsilon$, 242), 375 ($\epsilon$, 1700), 290 ($\epsilon$, 23,600), 240 ($\epsilon$, 20,800)

Example 7

Twenty-two ml. of a 1.6 molar solution of butyllithium in hexane was added to a solution of $$(CH_3)_3NHB_{10}H_{12}CH$$

(2.0 g.) in 75 ml. of 1,2-dimethoxyethane in a nitrogen atmosphere. The temperature rose to 60° C. Ferrous chloride (0.7 g.) was added; the mixture was stirred one hour, refluxed for three hours and allowed to stand for 16 hours. It was then filtered and the filter cake was dissolved in 50 ml. of water. Ten ml. of 50% aqueous cesium hydroxide solution was added and air was bubbled into the solution for ten minutes. $Cs_3(B_{10}H_{10}CH)_2Fe \cdot H_2O$ (1.6 g.) separated from solution. The analytical sample was recrystallized from water.

*Analysis.*—Calcd. for $Cs_3(B_{10}H_{10}CH)_2Fe \cdot H_2O$: B, 29.4; C, 3.3; H, 3.3; Fe, 7.6. Found: B, 29.2; C, 3.4; H, 3.4; Fe, 8.0.

Example 8

(A) Fifty ml. of a 1.6 molar solution of butyllithium in hexane was added to a solution of $(CH_3)NHB_{10}H_{12}CH$ in 100 ml. of tetrahydrofuran in a nitrogen atmosphere. The solution was cooled to 6° C. Three grams of $FeCl_2$ were added, resulting in a temperature rise to 10° C. The mixture was stirred 18 hrs.; the cooling bath was removed after the first hour. The tetrahydrofuran was decanted and the residue was washed rapidly with a small amount of tetrahydrofuran. The residue was then extracted with 100 ml. of water. The extracts were filtered through diatomaceous earth ("Celite") and the "Celite" was rinsed to obtain a total of 200 ml. of filtrate. This was mixed with 25 ml. of 50% aqueous cesium hydroxide to precipitate $Cs_3(B_{10}H_{10}CH)_2Fe \cdot H_2O$ (2.6 g.). The filtrate from the isolation of this salt was mixed with 10 g. of tetramethylammonium chloride to obtain a cloudy solution. This was filtered and the filtrate was mixed with 10 g. of tetrapropylammonium bromide to precipitate a salt containing $[(CH_3H_7)_4N]_4(B_{10}H_{10}CH)_2Fe$ (1.2 g.).

*Analysis.*—Calcd. for $[(C_3H_7)_4N]_4(B_{10}H_{10}CH)_2Fe$: B, 20.3; Fe, 5.3. Found: B, 23.5; Fe, 5.1.

(B) An experiment similar to the preceding was performed except that, prior to the addition of cesium hydroxide, 200 mg. of $FeCl_3$ was added to the aqueous solution and air was bubbled into the mixture for one hour. The yield of $Cs_3(B_{10}H_{10}CH)_2Fe \cdot H_2O$ was 3.6 g. and of the tetrapropylammonium salt was 0.3 g.

Example 9

A mixture of $(CH_3)_3NHB_{10}H_{12}CH$ (3.0 g.), anhydrous tetrahydrofuran (100 ml.) and a 1.6 M solution of butyllithium in hexane (50 ml.) was prepared in a nitrogen atmosphere and chilled in a water-ice bath. Manganese(II) chloride (3 g.) was added; the reaction mixture was stirred one hour and then allowed to stand. A dark oily layer settled to the bottom. The supernatant liquid was decanted; the residual oil was dissolved in 50 ml. of water and acidified with hydrochloric acid. The addition of trimethylammonium chloride (10 g.) precipitated a dark solid which was recrystallized from water to give $$[(CH_3)_3NH]_2(B_{10}H_{10}CH)_2Mn$$

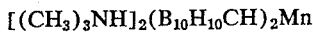

as nearly black needle-shaped crystals.

*Analysis.*—Calcd. for $[(CH_3)_3NH]_2(B_{10}H_{10}CH)_2Mn$: B, 49.5; C, 21.9; H, 9.7; N, 6.4; Mn, 12.5. Found: B, 49.5; C, 22.6; H, 9.5; N, 6.2; Mn, 11.7.

Example 10

A mixture of $(CH_3)_3NHB_{10}H_{12}CH$ (4.2 g.), 1,2-dimethoxyethane (125 ml.) and a 1.6 M solution of n-butyllithium in hexane (60 ml.) was prepared in a nitrogen atmosphere and cooled to 8° C. Titanium tetrachloride (2.0 ml.) was added. The reaction mixture was stirred one hour and the supernatant liquid was then decanted to leave a dark residue. This was dissolved in 100 ml. of water. The addition of 50% aqueous cesium fluoride solution (20 ml.) precipitated a dark green solid. This solid was stirred in 100 ml. of water with air bubbling through the solution until the color become golden yellow. The solid was dissolved by the addition of hydrochloric acid. The addition of tetrapropylammonium bromide precipitated an orange solid which was recrystallized from aqueous alcohol to give $[(C_3H_7)_4N]_2(B_{10}H_{10}CH)_2Ti$.

*Analysis.*—Calcd. for $[(C_3H_7)_4N]_2(B_{10}H_{10}CH)_2Ti$: B, 31.6; C, 45.7; H, 11.4; N, 4.1. Found: B, 29.1; C, 43.9; H, 12.0; N, 3.9.

Example 11

Fifteen ml. of a 1.6 molar solution of butyllithium was added to a solution of $CsB_{10}H_{12}CH$ (1.5 g.) in 50 ml. of 1,2-dimethoxyethane. The temperature rose to 53° C. After it dropped to 30° C., a slurry of $FeCl_2$ (1.9 g.) in 80 ml. of 1,2-dimethoxyethane was added. The mixture was stirred for two hours and then filtered. The filter cake was extracted with water, and the extract was filtered. Part of the filtrate was mixed with tetramethylammonium chloride to precipitate $[(CH_3)_4]_3(B_{10}H_{10}CH)_2Fe$, identified by infrared analysis.

Example 12

(A) Three grams of $(CH_3)_3NHB_{10}H_{12}CH$ was added to 75 ml. of 50% aqueous sodium hydroxide. The resulting solution was added to a solution of $CoCl_2 \cdot 6H_2O$ (12 g.) in 25 ml. of water to obtain a mixture which was heated ten minutes on a steam bath with periodic stirring. The reaction mixture was then diluted with 100 ml. of water and filtered through diatomaceous earth ("Celite"). The addition of 30 ml. of 50% aqueous cesium hydroxide to the filtrate precipitated $Cs_3(B_{10}H_{10}CH)_2Co \cdot H_2O$ as a yellow solid. After recrystallization from water, the yield was 3.8 g. The analytical sample was recrystallized from water using decolorizing carbon to obtain a golden-yellow product.

*Analysis.*—Calcd. for $Cs_3(B_{10}H_{10}CH)_2Co \cdot H_2O$: B, 29.3; C, 3.2; H, 3.2; Co, 8.0. Found: B, 29.6; C, 3.0; H, 3.3; Co, 8.0.

U.V. $\lambda_{max.}^{H_2O}$ 420 ($\epsilon$, 360), 275 ($\epsilon$, 41,300)

(B) Another sample of $Cs_3(B_{10}H_{10}CH)_2Co \cdot H_2O$, prepared by the same method as in Part A, was heated at 200° C. under vacuum for about 15 hours. Infrared analysis of the product showed that the salt had been converted to the anhydrous form, $Cs_3(B_{10}H_{10}CH)_2Co$.

Example 13

Three grams of $(CH_3)_3NHB_{10}H_{12}CH$ was added to 75 ml. of 50% aqueous sodium hydroxide. The resulting solution was added to a solution of $NiCl_2 \cdot 6H_2O$ (12 g.) in 25 ml. of water. The resulting mixture was heated on a steam bath for ten minutes with occasional agitation. It was then diluted with 100 ml. of water and filtered through diatomaceous earth ("Celite") to obtain a dark yellow filtrate. The addition of 30 ml. of 50% aqueous cesium hydroxide precipitated a dark solid. This was removed by filtration and recrystallized from water. Air was passed through the filtrate from separation of the crude product. The color of the filtrate lightened and a solid precipitated. This was combined with that isolated from the recrystallization above and the combined solid was recrystallized from water to obtain 1.1 g. of $$Cs_2(B_{10}H_{10}CH)_2Ni$$

as gray needles.

*Analysis.*—Calcd. for $Cs_2(B_{10}H_{10}CH)_2Ni$: B, 36.8; C, 4.1; H, 3.7; Ni, 10.0. Found: B, 35.6; C, 3.5; H, 3.3; Ni, 10.3.

U.V. $\lambda_{max.}^{H_2O}$ 290 (38,400)

In a similar preparation, recrystallization of the product from water utilizing decolorizing carbon gave the product as yellow-orange crystals. This result indicated that the cesium salt described above was substantially pure, as shown by the elemental analysis, but contained a trace impurity that masked its true color.

*Analysis.*—Found: Ni, 10.1.

U.V. $\lambda_{max.}^{H_2O}$ 288 ($\epsilon$, 40,400)

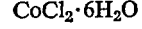

Example 14

A solution obtained by adding $(CH_3)_3NHB_{10}H_{12}CH$ to aqueous 1% sodium hydroxide was treated with $$CoCl_2 \cdot 6H_2O$$

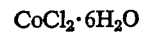

The mixture was stirred 5 minutes and then filtered through diatomaceous earth ("Celite") to obtain a dark yellow filtrate. The addition of 50% aqueous cesium hydroxide solution precipitated a yellow-brown solid which, by infrared analysis, was crude $Cs_3(B_{10}H_{10}CH)_2Co \cdot H_2O$.

Example 15

A solution obtained by adding $(CH_3)_3NHB_{10}H_{12}CH$ to aqueous 10% sodium hydroxide was treated with $$CoCl_2 \cdot 6H_2O$$

The mixture was stirred 10 minutes and then filtered through "Celite." Tetramethylammonium chloride was added to the filtrate to precipitate $(CH_3)_4NB_{10}H_{12}CH$ which was removed by filtration. Aqueous 50% cesium hydroxide was added to the resulting yellow filtrate and this solution was concentrated partially and cooled to precipitate $Cs_3(B_{10}H_{10}CH)_2Co \cdot H_2O$, identified by infrared analysis.

Example 16

A mixture of $Cs_3(B_{10}H_{10}CH)_2Co \cdot H_2O$ (6.8 g.) and acetonitrile (100 ml.) was cooled to 5° C. in a water-ice bath. Chlorine was passed into the solution. The temperature rose to 20° C.; chlorination was continued until the temperature fell to 10° C. with continual cooling in a water-ice bath. The acetonitrile was evaporated and the residual solid was recrystallized two times from water and dried at 80° C. in vacuo for 16 hours. The product was a mixture of orange solids having the average composition $Cs_3(B_{10}H_{2.5}Cl_{7.5}CH)_2Co \cdot H_2O$.

*Analysis.*—Calc'd. for $C_3(B_{10}H_{2.5}Cl_{7.5}CH)_2Co \cdot H_2O$: B, 17.2; Cl, 42.4; Co, 4.7. Found: B, 18.0; Cl, 43.3; Co, 5.5.

U.V. $\lambda_{max.}^{H_2O}$ 330 ($\epsilon$, 39,800)

Example 17

Chlorine was passed into a mixture of $Cs_3(B_{10}H_{10}CH)_2Fe \cdot H_2O$ and acetonitrile. Heat was evolved and a clear solution was formed. The introduction of chlorine was continued until the temperature dropped back to 25° C. The solution was evaporated on a steam bath. The residue was dissolved in water. The addition of tetramethylammonium chloride precipitated a derivative of $[(CH_3)_4N]_3(B_{10}H_{10}CH)_2Fe$ in which part of the hydrogen atoms on boron had been replaced by chlorine as shown by infrared analysis.

Example 18

Chlorine was passed into an aqueous solution of $Cs_3(B_{10}H_{10}CH)_2Co$ with concurrent heating on a steam bath. A golden yellow solution resulted. The addition of tetramethylammonium chloride precipitated a golden solid which was demonstrated by infrared analysis to be a partially chlorinated derivative of $[(CH_3)_4N]_3(B_{10}H_{10}CH)_2Co$.

Example 19

The preceding experiment was repeated with bromine in place of chlorine. An orange solid which was a partially brominated derivative of $[(CH_3)_4N]_3(B_{10}H_{10}CH)_2Co$ was obtained.

Example 20

(A) An aqueous solution of $Cs_2(B_{10}H_{10}CH)_2Ni$ was passed through an ion exchange column packed with a strongly acidic ion exchange resin to obtain an aqueous solution of $H_2(B_{10}H_{10}CH)_2Ni$. Concentration of this on a steam bath gave a yellow-brown syrup which was a hydrate of $H_2(B_{10}H_{10}CH)_2Ni$ according to infrared analysis. Further drying converted this to a yellow powdery hygroscopic solid which contained a hydrate of $H_2(B_{10}H_{10}CH)_2Ni$ Similar results were obtained with $Cs_3(B_{10}H_{10}CH)_2Co \cdot H_2O$ and $Cs_3(B_{10}H_{10}CH)_2Fe \cdot H_2O$.

(B) An aqueous solution of $Cs_3(B_{10}H_{10}CH)_2Fe$ was passed through an ion exchange column packed with a strongly acidic ion exchange resin. The effluent was evaporated in vacuo at below 30° C. to obtain a thick dark syrup of a hydrate of $H_3(B_{10}H_{10}CH)_2Fe$.

Example 21

The addition of aqueous silver nitrate to a solution of $Cs_3(B_{10}H_{10}CH)_2Co \cdot H_2O$ in dilute nitric acid precipitated $Ag_3(B_{10}H_{10}CH)_2Co$, a yellow solid.

Example 22

Aqueous tetraphenylarsonium chloride was added to a solution prepared from $[(CH_3)_3NH]_2(B_{10}H_{10}CH)_2Mn$ and dilute sodium hydroxide. A gray solid precipitated and was removed by filtration. It was identified as $(\phi_4As)_2(B_{10}H_{10}CH)_2Mn$ by its infrared absorption spectrum.

Example 23

A solution of $(NH_4)_2Ce(SO_4)_4$ (8 g.) and 18 M sulfuric acid (2 ml.) in water (50 ml.) was added to a solution of $Cs_3(B_{10}H_{10}CH)_2Co \cdot H_2O$ (3.9 g.) in water (100 ml.). The mixture was filtered. Tetramethylammonium hydroxide was added. Filtration gave a dark blue solid (A) plus a yellow filtrate. The yellow filtrate was treated with additional $(NH_4)_2Ce(SO_4)_4$ to precipitate more dark blue solid (B). Solids A and B were crude $[(CH_3)_4N]_2(B_{10}H_{10}CH)_2Co$ Solid B was purified by extraction with acetonitrile followed by slow concentration of the extracts in an air stream at ambient temperature. Pure $[(CH_3)_4N]_2(B_{10}H_{10}CH)_2Co$ separated as a black crystalline solid. This was dried at room temperature in vacuo.

*Analysis.*—Calcd. for $[(CH_3)_4N]_2(B_{10}H_{10}CH)_2Co$: B, 46.0; C, 25.5; H, 9.8; N, 6.0. Found: B, 45.4; C, 25.6; H, 9.9; N, 6.2.

U.V. $\lambda_{max.}^{CH_3CN}$ 627 ($\epsilon$, 141), 410 ($\epsilon$, 590), 285 ($\epsilon$, 31,000)

Examples 1 through 11 illustrate the preparation of representative compounds of the invention by reaction of the boron compound with a base in an ether medium. Any of the organo-lithium bases, the alkali metals, and the alkali metal hydrides mentioned previously can be employed in place of the base used in the examples.

Examples 12–15 illustrate the preparation of compounds of the invention using aqueous alkali metal hydroxide as the base. Lithium hydroxide, potassium hydroxide, and the like can be employed in place of sodium hydroxide.

In Examples 1–15, the transition-metal-containing reactant is introduced as the chloride; however, the bromide or iodide forms can be employed if desired.

Examples 16–19 illustrate the halogenation procedures whereby the X substituent can be placed on the $B_{10}H_{10}CH^{3-}$ fragment. By employing fluorine or iodine or a mixed halogen, such as ICl, the corresponding products containing fluorine or iodine are obtained.

Examples 20–22 illustrate some of the cation-exchange procedures employed to obtain the range of M cations defined previously. Examples 1–19 also illustrate cation-exchange techniques used in isolating the products.

Examples 7, 8–B, 10, 13 and 23 illustrate oxidation of the transition metal to its higher state; while Example 3–B illustrates reduction to a lower state.

All the products of this invention are colored solids and have utility as coloring agents in glassware, plastics and the like. In addition, the products of this invention are useful as dyes for cloth or fabrics, as shown by the following examples:

Example A

An aqueous solution of $Cs_3(B_{10}H_{10}CH)_2Co$ was heated to boiling. Strips of cloth were immersed for about a minute in the boiling solution. Concentrated aqueous tetrapropylammonium bromide was then added to precipitate $[(CH_3H_7)_4N]_3(B_{10}H_{10}CH)_2Co$, thus "fixing" any color imparted to the cloth. The cloth was removed, washed with water and dried. The following fabrics were dyed yellow by this process: cellulose acetate, cotton (raw), silk, viscose rayon, wool, polyacrylonitrile (four different samples), and polyethylene terephthalate (two different samples).

Example B

The previous example was repeated using a $$Cs_3(B_{10}H_{10}CH)_2Cr$$

solution in place of the $Cs_3(B_{10}H_{10}CH)_2Co$ solution. All of the fabrics mentioned in the previous example plus cellulose triacetate and nylon were dyed a pastel pink.

Example C

An experiment similar to Example A was carried out using a solution of $Cs_3(B_{10}H_{10}CH)_2Fe$ in place of the cobalt compound solution. Polyacrylonitrile, wool, nylon and silk fabrics were dyed brown or beige.

The products of this invention are also useful in solution forms as colored marking fluids, as shown by the following example:

Example D

A hot aqueous solution of $Cs_3(B_{10}H_{10}CH)_2Fe$ was used as a marking fluid by filling a narrow bore medicine dropper with it and using this as a pen. A visible brown line could thus be drawn. After the line dried, the mark was not eradicated by wiping with a paper towel.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. Compounds represented by the formula $$M_m[(B_{10}H_{10-n}X_nCH)_2M']$$

wherein
M is a cation selected from the group consisting of hydrogen, an alkali metal, one equivalent of an alkaline - earth metal, silver, ammonium, $RNH_3^+$, $RR'NH_2^+$, $RR'_2NH^+$, $RR'_3N^+$, $R_4P^+$, $R_3S^+$, $R_4As^+$, and $R_4Sb^+$, wherein R is an aliphatically saturated hydrocarbyl group of up to 18 carbon atoms, R' is an R group that is bonded to N through aliphatic carbon, and any two R and R' groups in one cation can be covalently joined together to form a divalent group of up to 18 carbon atoms selected from the class consisting of aliphatically saturated hydrocarbon and aliphatically saturated monooxahydrocarbon;

m is a whole number of 2 through 4 and is equal to the valence of the $[(B_{10}H_{10-n}X_nCH)_2M']$ entity;

X is halogen substituted on boron by replacement of hydrogen;

n is a whole number of 0 through 8 and represents the number of X substituents substituted on boron; and M' is a transition metal cation selected from the group consisting of Ti(IV), Fe(II), Fe(III), Cr(III), Mn(IV), Co(II), Co(III), Co(IV), and Ni(IV).

2. Compounds of claim 1 wherein n is zero.
3. Compounds of claim 2 wherein M' is Fe(III).
4. Compounds of claim 2 wherein M' is Cr(III).
5. Compounds of claim 2 wherein M' is Co(III).
6. Compounds of claim 2 wherein M' is Mn(IV).
7. The compound of claim 3 wherein M is Cs and m is 3.
8. The compound of claim 5 wherein M is $(CH_3)_4N$ and m is 3.
9. The compound of claim 4 wherein M is Cs and m is 3.
10. The compound of claim 6 wherein M is $(CH_3)_3NH$ and m is 2.
11. A hydrate of the compound of claim 1 which has the formula $H_2(B_{10}H_{10}CH)_2Ni$.
12. Process which comprises reacting, in the presence of an inert solvent, a boron compound of the formula $$M''B_{10}H_{12}CH$$

wherein
M'' is selected from the class consisting of an alkali metal, one equivalent of an alkaline-earth metal, silver, ammonium, $RNH_3^+$, $RR'NH_2^+$, $RR'_2NH^+$, $RR'_3N^+$, $R_4P^+$, $R_3S^+$, $R_4As^+$, and $S_4Sb^+$, wherein R is an aliphatically saturated hydrocarbyl group of up to 18 carbon atoms, R' is an R group that is bonded to N through aliphatic carbon, and any two R and R' groups in one cation can be covalently joined together to form a divalent group of up to 18 carbon atoms selected from the class consisting of aliphatically saturated hydrocarbon and aliphatically saturated monooxahydrocarbon; with a base selected from the group consisting of alkyllithium, an aryllithium, an alkaryllithium, each of up to 12 carbon atoms, an alkali metal, and an alkali-metal hydride; followed by the addition of a compound selected from the group consisting of $TiZ_4$, $M'''Z_3$ and $M^{IV}Z_2$ wherein M''' is selected from the group consisting of Fe(III) and Cr(III), and $M^{IV}$ is selected from the group consisting of Mn(II), Fe(II), Co(II) and Ni(II), and Z is selected from the group consisting of chloride, bromine and iodine, said steps being carried out at a temperature range of between $-50°$ C. and $+100°$ C.

13. Process which comprises reacting a boron compound of the formula $$MB_{10}H_{12}CH$$

wherein
M is defined as in claim 1, with a 1–50% aqueous alkali-metal hydroxide solution; followed by the additon of a compound selected from the class consisting of $CoZ_2$ and $NiZ_2$ wherein Z is selected from the class consisting of chlorine, bromine and iodine, said steps being carried out at a temperature range of between $-50°$ C. and $+100°$ C.

No references cited.

TOBIAS E. LEVOW, *Primary Examiner.*

A. P. DEMERS, *Assistant Examiner.*